US008743302B2

(12) United States Patent
Inoue et al.

(10) Patent No.: US 8,743,302 B2
(45) Date of Patent: Jun. 3, 2014

(54) DISPLAY DEVICE

(75) Inventors: Yuichi Inoue, Kanagawa (JP); Sho Sakamoto, Tokyo (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 13/445,409

(22) Filed: Apr. 12, 2012

(65) Prior Publication Data
US 2012/0268697 A1 Oct. 25, 2012

(30) Foreign Application Priority Data
Apr. 19, 2011 (JP) .................................. 2011-093345

(51) Int. Cl.
*G02F 1/1335* (2006.01)

(52) U.S. Cl.
USPC .......................................................... 349/15

(58) Field of Classification Search
USPC .......................................................... 349/15
See application file for complete search history.

(56) References Cited

U.S. PATENT DOCUMENTS

2012/0200806 A1 * 8/2012 Inoue .............................. 349/62

FOREIGN PATENT DOCUMENTS

JP 03-119889 5/1991

* cited by examiner

*Primary Examiner* — Phu Vu
(74) *Attorney, Agent, or Firm* — Sheridan Ross P.C.

(57) ABSTRACT

A display device includes: a display section including a plurality of display pixels; and a liquid crystal barrier section including a plurality of barrier regions. Each of the barrier regions extends in a first direction inclined with respect to an arrangement direction of the display pixels, and allows light to transmit therethrough and blocks the light. The liquid crystal barrier section includes: a liquid crystal layer; and a first electrode layer and a second electrode layer interposing the liquid crystal layer in between. The first electrode layer includes an electrode pattern having a slit provided along the first direction in the barrier regions.

10 Claims, 17 Drawing Sheets

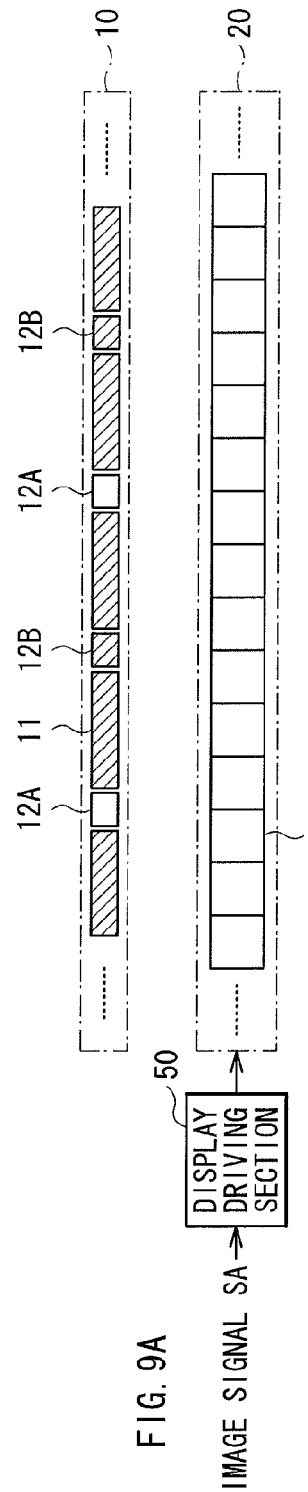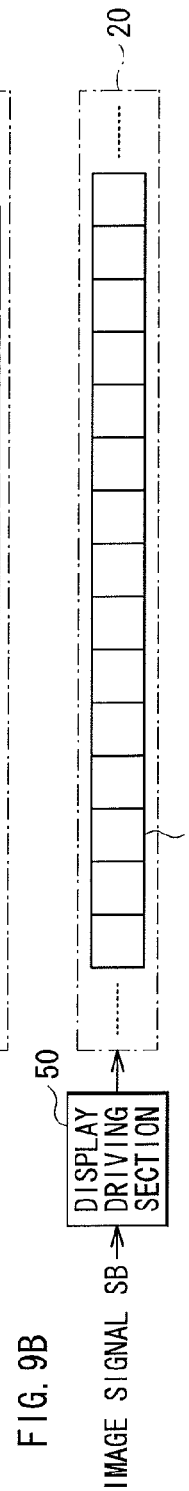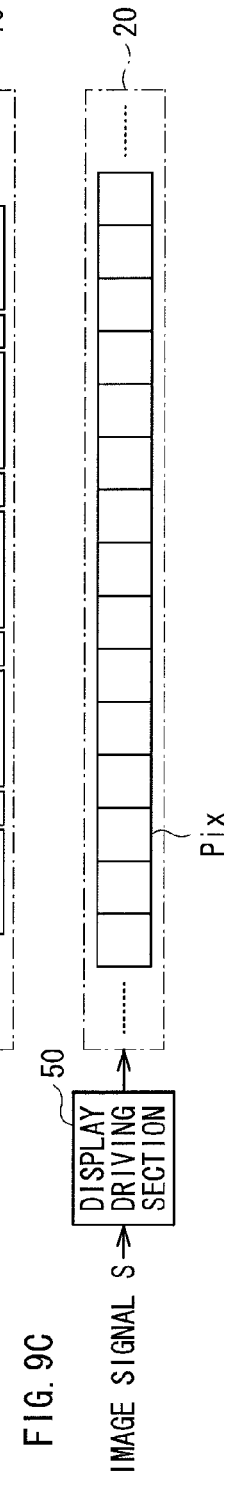

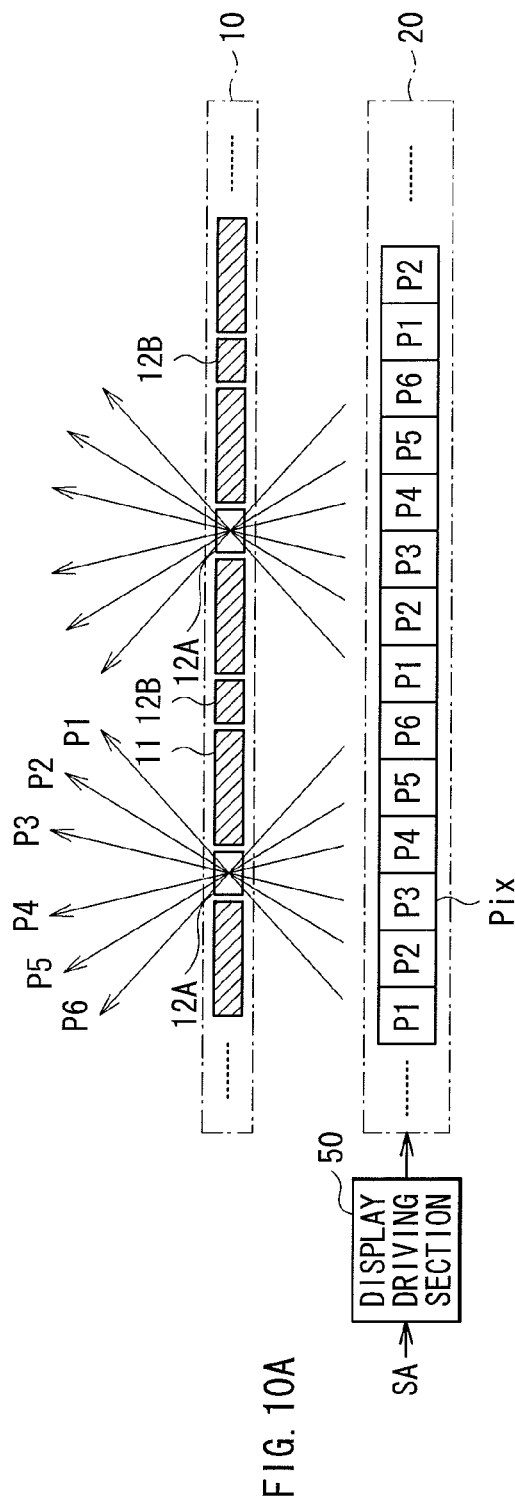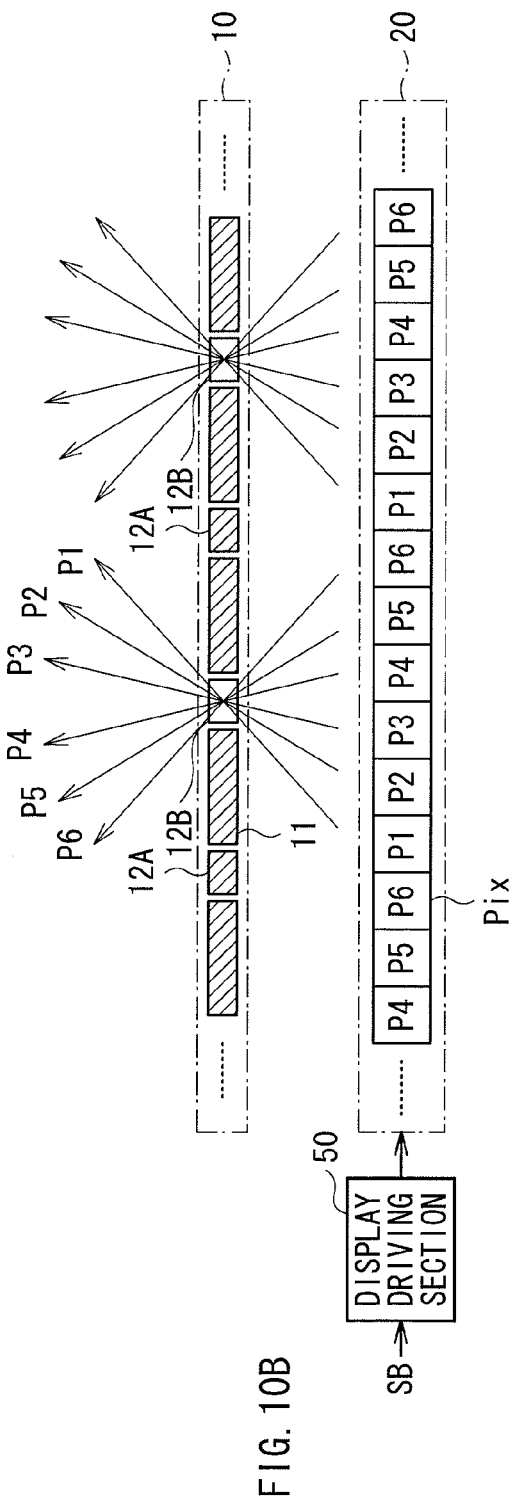

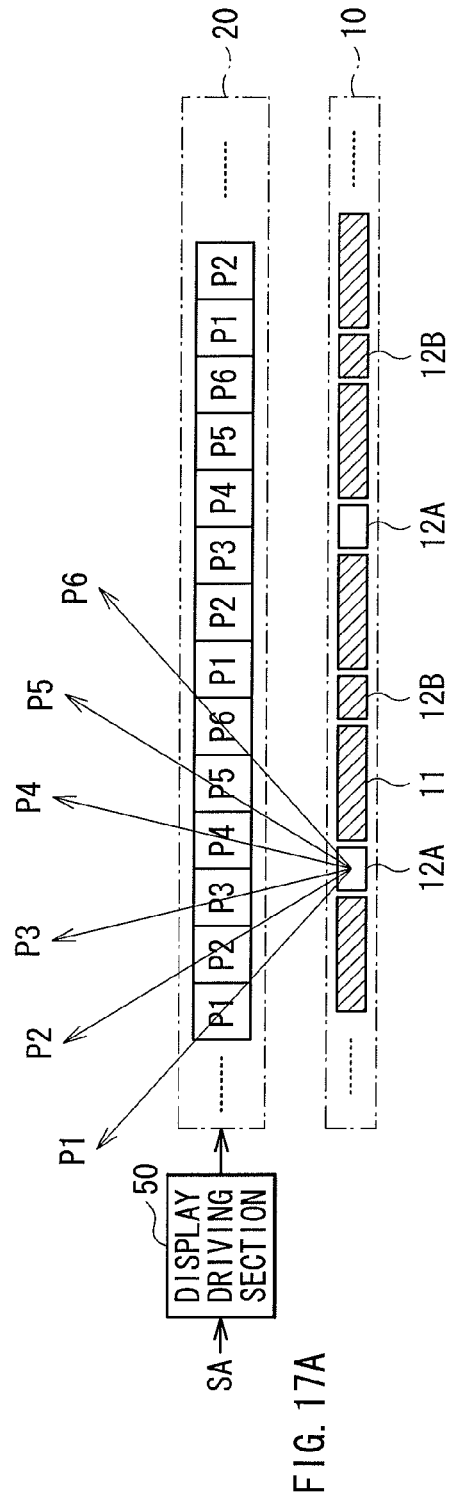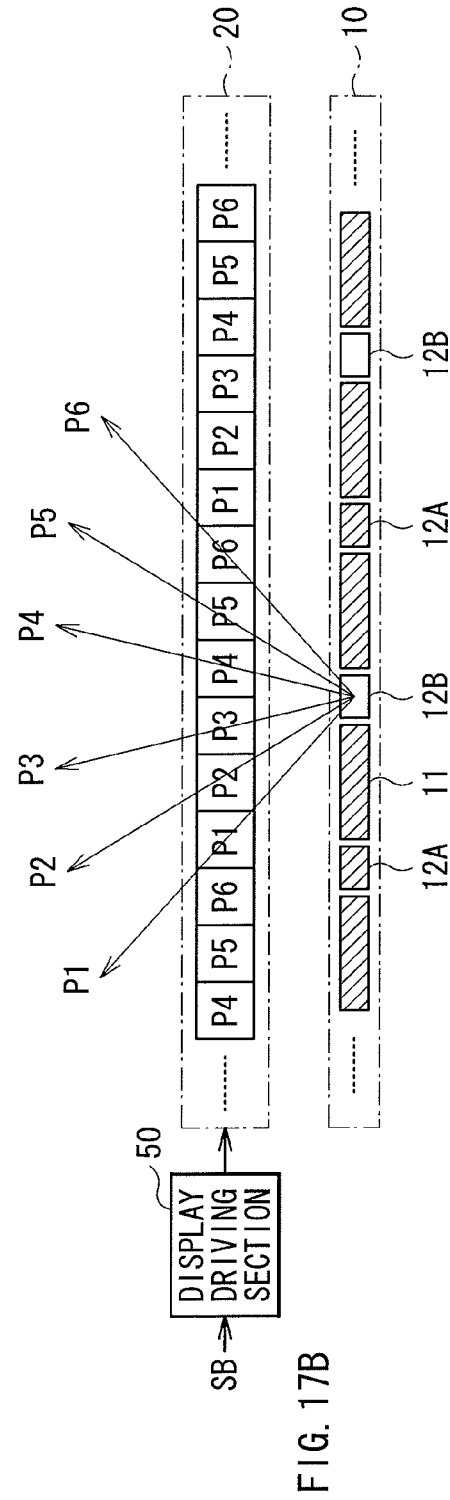

DISPLAY DEVICE

BACKGROUND

The present disclosure relates to a display device of a parallax barrier type capable of performing a stereoscopic display.

In recent years, display devices capable of performing a stereoscopic display are drawing attention. The stereoscopic display is a technique for displaying an image for a left eye and an image for a right eye having parallax therebetween (having different perspectives from each other), and, when viewing the images by his/her left and right eye respectively, a viewer can recognize the images as a stereoscopic image having a stereoscopic effect. In addition, display devices capable of providing viewers with more natural stereoscopic images by displaying three or more images having parallax thereamong are also under development.

Such display devices fall in two major categories: display devices that require dedicated eyeglasses and display devices that do not require dedicated eyeglasses. Since the dedicated eyeglasses may be troublesome for the viewer, the display devices that do not require dedicated eyeglasses are desired. As the display devices that do not require dedicated eyeglasses, a parallax barrier scheme, a lenticular lens scheme, and the like are known, for example. In these schemes, a plurality of images (perspective images) having parallax thereamong are simultaneously displayed to provide an image which is viewed differently according to a relative positional relationship (angle) between a display device and a perspective of the viewer. An exemplary display device using a parallax barrier scheme is disclosed in Japanese Unexamined Patent Application Publication No. H03-119889.

SUMMARY

Incidentally, in display devices using the above-mentioned lenticular lens scheme and parallax barrier scheme, due to the structure thereof, moire tends to occur in an image. Although many improvements have been proposed with the aim of reducing moire, higher image quality is still desired.

It is desirable to provide a display device capable of achieving an improved image quality.

A display device according to an embodiment of the present disclosure includes: a display section including a plurality of display pixels; and a liquid crystal barrier section including a plurality of barrier regions. Each of the barrier regions extends in a first direction inclined with respect to an arrangement direction of the display pixels, and allows light to transmit therethrough and blocks the light. The liquid crystal barrier section includes a liquid crystal layer, and a first electrode layer and a second electrode layer interposing the liquid crystal layer in between. The first electrode layer includes an electrode pattern having a slit provided along the first direction in the barrier regions.

A display device according to another embodiment of the present disclosure includes: a display section including a plurality of display modes, in which the display modes includes a first mode and a second mode; and a liquid crystal barrier section including a plurality of barrier regions. The barrier regions include a first sub-region and a second sub-region and allow light to transmit therethrough and block the light. The first sub-region is in a transmission state and the second sub-region is in a blocking state in the first mode, and the first and the second sub-regions are in the transmission state in the second mode. The liquid crystal barrier section includes a liquid crystal layer, and a first electrode layer and a second electrode layer interposing the liquid crystal layer in between. The first electrode layer includes an electrode pattern having a slit provided in the second sub-region.

In the display devices according to the above embodiments of the present disclosure, the electrode pattern including the slit that extends in the first direction different from the arrangement direction of the display pixels is provided in the first electrode layer in the liquid crystal barrier section. Thus, when the display section and the liquid crystal barrier section are superposed, the slit passes through each pixel of the display section. A boundary section and the slit of the barrier regions are visually recognized as dark lines, that is, as regions having a luminance lower than the surrounding portions. If unevenness in intervals of the dark lines is great, unevenness in apparent brightness in a display screen becomes significant. However, since the slit is provided in the electrode pattern, the unevenness in the intervals of the dark lines is decreased. Hence, the uneveness in the apparent brightness in the display screen is lessened.

According to the display devices of the above embodiments of the present disclosure, the slit that extends in the first direction different from the arrangement direction of the display pixels is provided in the electrode pattern in the liquid crystal barrier section. This makes it possible to lessen the unevenness in the apparent brightness in the display screen. Hence, it is possible to effectively suppress occurrence of moire, and achieve an improved image quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 9A to 9C are schematic views each illustrating an exemplary operation of the display section and the liquid crystal barrier section shown in FIG. 1.

FIGS. 10A and 10B are other schematic views illustrating an exemplary operation of the display section and the liquid crystal barrier section shown in FIG. 1.

FIGS. 17A and 17B are schematic views each illustrating an exemplary operation of the display device shown in FIGS. 16A and 16B.

DETAILED DESCRIPTION

Referring to the figures, an embodiment of the present disclosure will be specifically described below.

[General Configuration]

Figure 1:
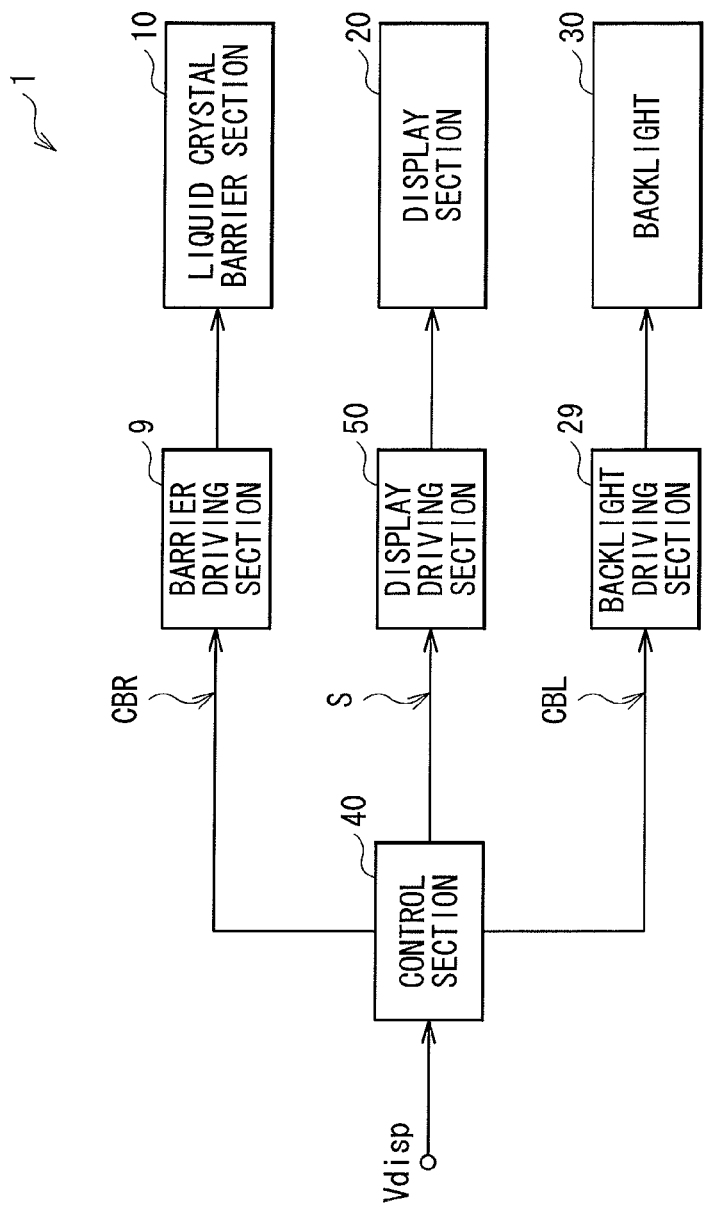
FIG. 1 is a block diagram illustrating an exemplary configuration of a display device according to an embodiment of the present disclosure.

FIG. 1 illustrates an exemplary configuration of a display device 1 according to an embodiment of the present disclosure. The display device 1 is capable of achieving both of a stereoscopic display (three-dimensional display) and a normal display (two-dimensional display). The display device 1 includes a control section 40, a display driving section 50, a display section 20, a backlight driving section 29, a backlight 30, a barrier driving section 9, and a liquid crystal barrier section 10.

The control section 40 is a circuit that supplies a control signal to each of the display driving section 50, the backlight driving section 29, and the barrier driving section 9 on the basis of an externally-supplied image signal Vdisp, in order to control these sections to operate in synchronism with each other. Specifically, the control section 40 supplies the display driving section 50 with an image signal S based on the image signal Vdisp, supplies the backlight driving section 29 with a backlight control signal CBL, and supplies the barrier driving section 9 with a barrier control signal CBR. Here, in the case where the stereoscopic display device 1 performs a stereoscopic display, the image signal S is made up of image signals SA and SB each includes a plurality of (six, in this case) perspective images, as described later.

The display driving section 50 drives the display section 20 on the basis of the image signal S supplied from the control section 40. In order to perform a display, the display section 20 drives liquid crystal elements to modulate light emitted from the backlight 30.

The backlight driving section 29 drives the backlight 30 on the basis of a backlight control signal supplied from the control section 40. The backlight 30 has a function of outputting surface-emitted light to the display section 20. The backlight 30 is configured by, for example, an LED (Light Emitting Diode), CCFL (Cold Cathode Fluorescent Lamp) or the like.

The barrier driving section 9 drives the liquid crystal barrier section 10 on the basis of a barrier control command supplied from the control section 40. The liquid crystal barrier section 10 has a plurality of opening-closing sections 11 and a plurality of opening-closing sections 12 each of which allows light to pass therethrough or blocks light (described later), and in this case, the liquid crystal barrier section 10 has a function of dividing light emitted from by the display section 20 toward a predetermined direction.

Figure 2A:
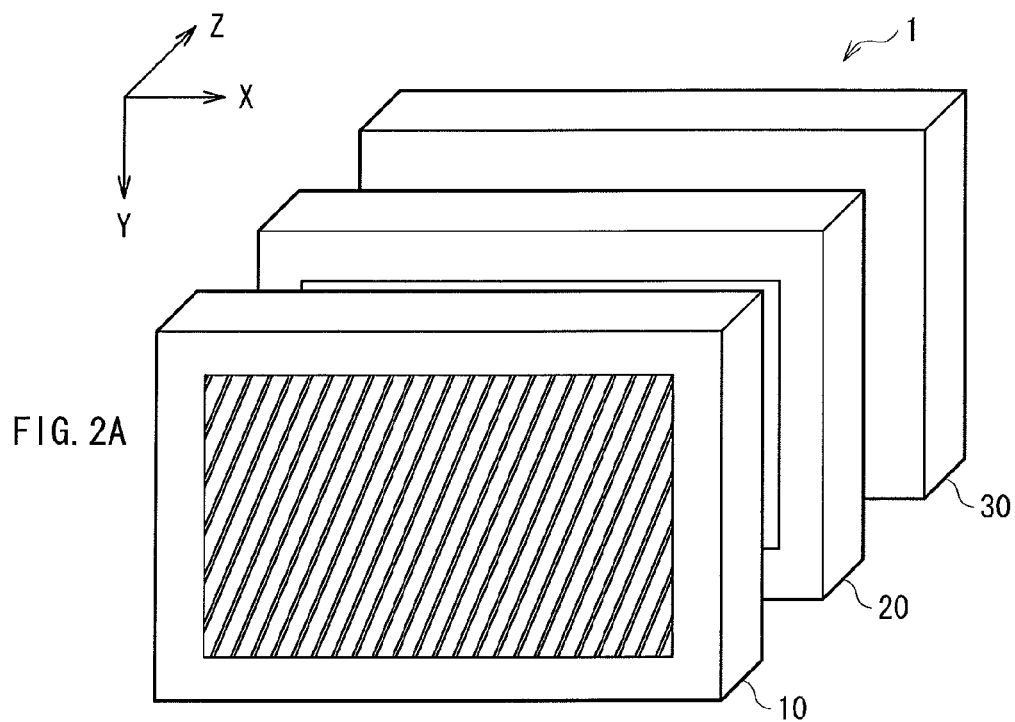
FIGS. 2A and 2B are explanatory diagrams each illustrating an exemplary configuration of the display device shown in FIG. 1.
Figure 2B:
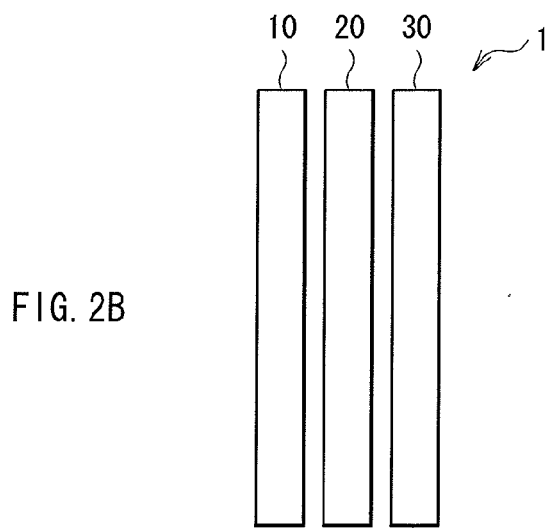

FIGS. 2A and 2B illustrate an exemplary configuration of a major section of the display device 1. FIG. 2A shows a perspective view of the configuration of the display device 1, and FIG. 2B shows a side view of the configuration of the display device 1. As shown in FIGS. 2A and 2B, in the display device 1, the backlight 30, the display section 20, and the liquid crystal barrier section 10 are disposed in this order from the backlight 30. That is, light emitted from the backlight 30 reaches the viewer after sequentially passing through the display section 20 and the liquid crystal barrier section 10. It is to be noted that, the display section 20 and the liquid crystal barrier section 10 may be bonded together, and may also be not bonded together.

(Display Driving Section 50 and Display Section 20)

Figure 3:
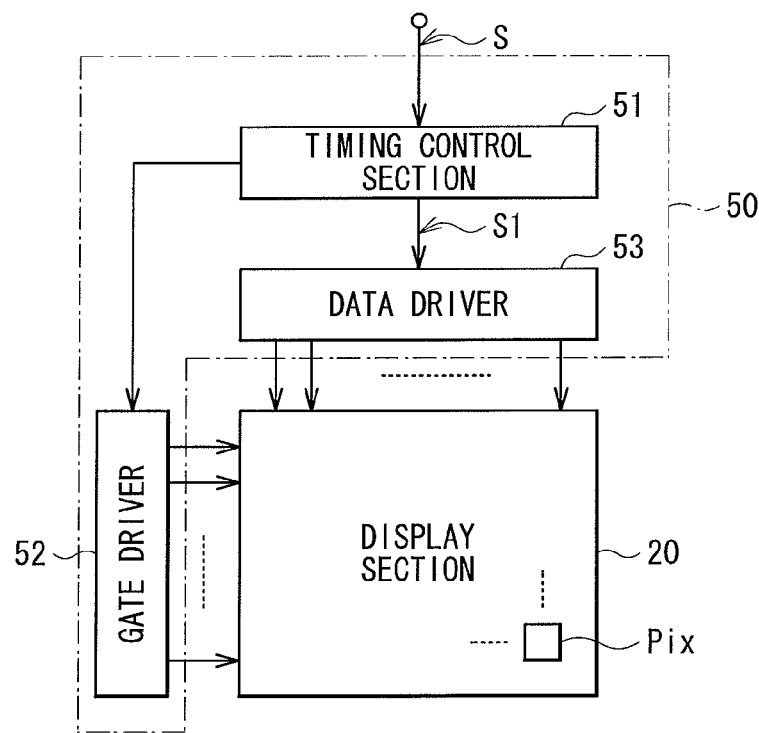
FIG. 3 is an explanatory diagram illustrating an exemplary configuration of the display section and the display driving section shown in FIG. 1.

FIG. 3 illustrates an exemplary block diagram of the display driving section 50 and the display section 20. In the display section 20, pixels Pix are disposed in matrix. The display driving section 50 includes a timing control section 51, a gate driver 52, and a data driver 53. The timing control section 51 controls drive timings for the gate driver 52 and the data driver 53, and supplies an image signal S supplied from the control section 40 to the data driver 53, as an image signal 51. In response to the timing control by the timing control section 51, the gate driver 52 sequentially selects and line-sequentially scans pixels Pix in a liquid crystal display device 45 (described later) in a row-by-row basis. The data driver 53 supplies a pixel signal based on the image signal 51 to each pixel Pix of the display section 20. Specifically, the data driver 53 performs a D/A (digital/analog) conversion based on the image signal 51 to generate a pixel signal which is an analog signal, and supplies the pixel signal to each pixel Pix.

The display section 20 has a configuration in which a liquid crystal material is enclosed between two transparent substrates configured of a glass, for example. A transparent electrode configured of, for example, an ITO (Indium Tin Oxide) is formed at a portion of each of the transparent substrates facing the liquid crystal material, thereby configuring the pixel Pix together with the liquid crystal material. As the liquid crystal material in the display section 20, a liquid crystal of a VA mode, an IPS mode, or a TN mode using a nematic liquid crystal is used, for example. Below, a configuration of the display section 20 (pixel Pix) is described in detail.

Figure 4A:
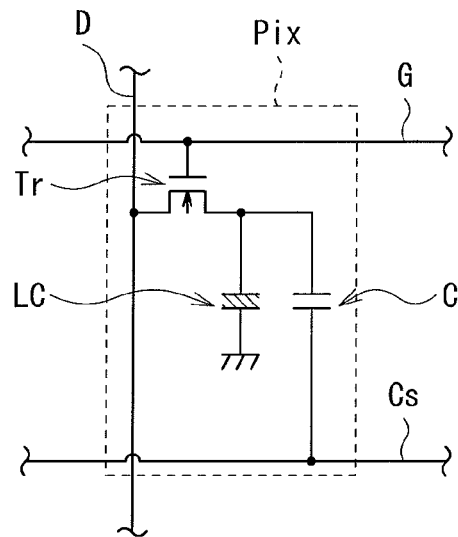
FIGS. 4A and 4B are explanatory diagrams illustrating an exemplary configuration of the pixel circuit and an exemplary sectional configuration of the pixel shown in FIG. 3, respectively.

FIG. 4A illustrates an exemplary circuit diagram of the pixel Pix. The pixel Pix includes a TFT (Thin Film Transistor) element Tr, a liquid crystal element LC, and a holding capacitive element C. The TFT element Tr is configured of, for example, a MOS-FET (Metal Oxide Semiconductor-Field Effect Transistor), and the gate thereof is connected to a gate line G, the source thereof is connected to a data line D, and the drain thereof is connected to one end of the liquid crystal element LC and one end of the holding capacitive element C. One end of the liquid crystal element LC is connected to the drain of the TFT element Tr, and other end thereof is grounded. One end of the holding capacitive element C is connected to the drain of the TFT element Tr, and other end thereof is connected to a holding capacitive line Cs. The gate line G is connected to the gate driver 52, and a data line D is connected to the data driver 53.

Figure 4B:
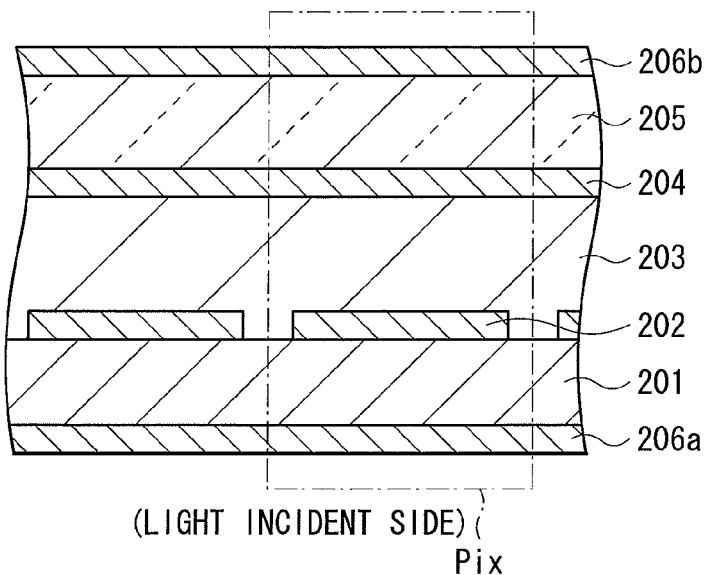

FIG. 4B illustrates a sectional configuration of the display section 20 including the pixel Pix. As illustrated, in the display section 20, a liquid crystal layer 203 is enclosed between a drive substrate 201 and an opposite substrate 205 as viewed in cross-section. The drive substrate 201 is a substrate in which a pixel driving circuit including the above-mentioned TFT element Tr is formed, and on the drive substrate 201, a pixel electrode 202 is disposed for each pixel Pix. In the opposite substrate 205, a color filter and a black matrix not shown are formed, and on the face on the liquid crystal layer 203 side, an opposite electrode 204 is disposed as an electrode common to the pixels Pix. On the light incident side (backlight 30 side, in this case) and the light emitting side (liquid crystal barrier section 10 side, in this case) of the display section 20, polarization plates 206a and 206b are bonded in such a manner as to establish a cross nicol state or a parallel nicol state.

Figure 5:
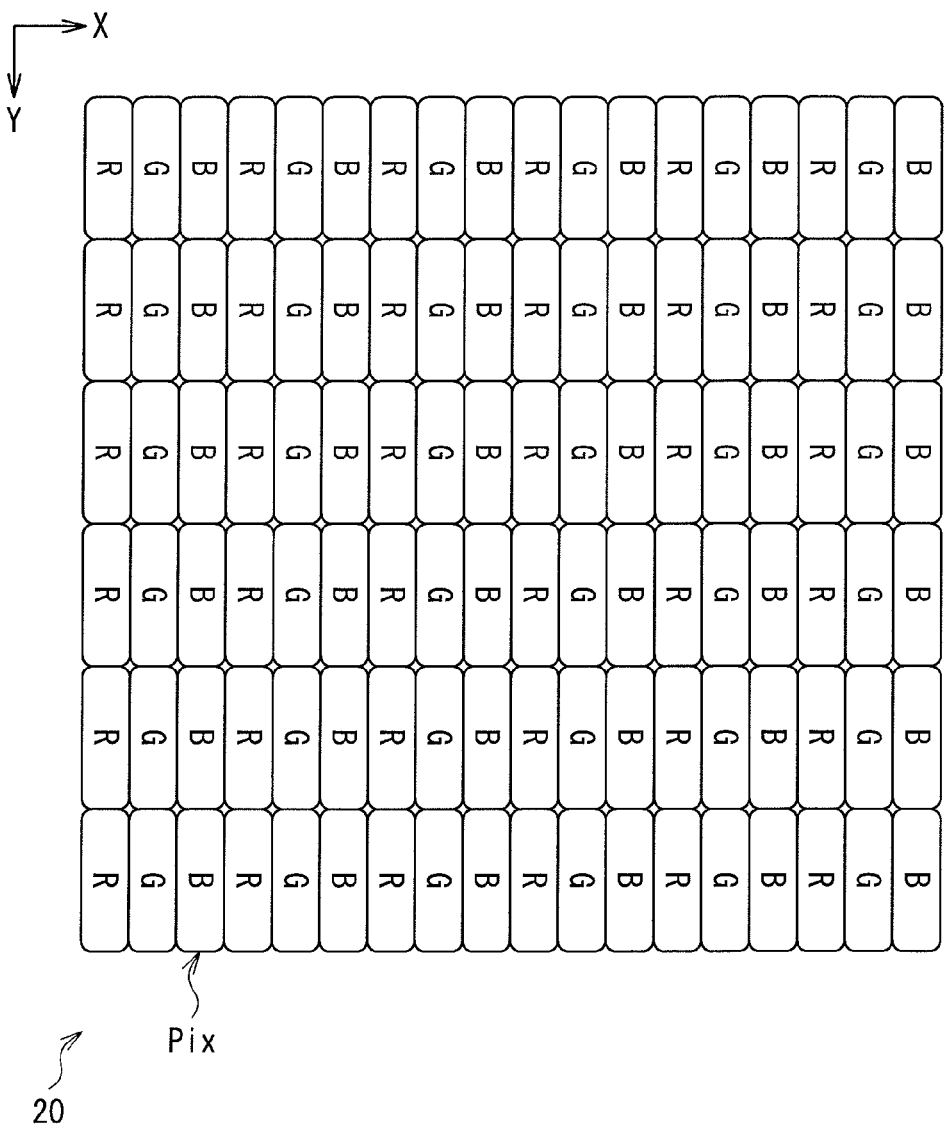
FIG. 5 is a plan view illustrating an exemplary configuration of a pixel arrangement of the display section shown in FIG. 1.

FIG. 5 illustrates an exemplary configuration of a pixel arrangement of the display section 20. As shown in FIG. 5, the pixels Pix are arranged in matrix in a plane (in an XY plane) parallel to the drive substrate 201 and the opposite substrate 205. Specifically, the display section 20 has a pixel structure in which a plurality of pixels Pix of three colors of R (red), G (green), and B (blue) necessary for a color display (displayed by R, G, and B) are two-dimensionally arranged. As shown in FIG. 5, in the pixel arrangement, pixels Pix of the different colors are periodically placed on the same row in the horizontal direction of the screen (X axis direction), and, pixels Pix having the same color are arranged on the same row in the vertical direction of the screen (Y axis direction). Each of a plurality of the gate lines G from the gate driver 52 extends along, for example, the pixels Pix arranged in the X axis direction, and each of a plurality of the data lines D from the data driver 53 extends along, for example, the pixels Pix arranged in the Y axis direction. As described above, in the display section 20, the data lines D and gate lines G as signal lines and scan lines for supplying a voltage to the pixels Pix are provided, and the pixels Pix are disposed in matrix along the data lines D and gate lines G.

(Backlight 30)

The backlight 30 has a configuration in which, for example, LEDs (Light Emitting Diodes) are disposed on, for example, a lateral face of a light guide plate. Alternatively, the backlight 30 may have a configuration in which a plurality of CCFLs (Cold Cathode Fluorescent Lamps) or the like are arranged.

(Liquid Crystal Barrier Section 10)

Figure 6A:
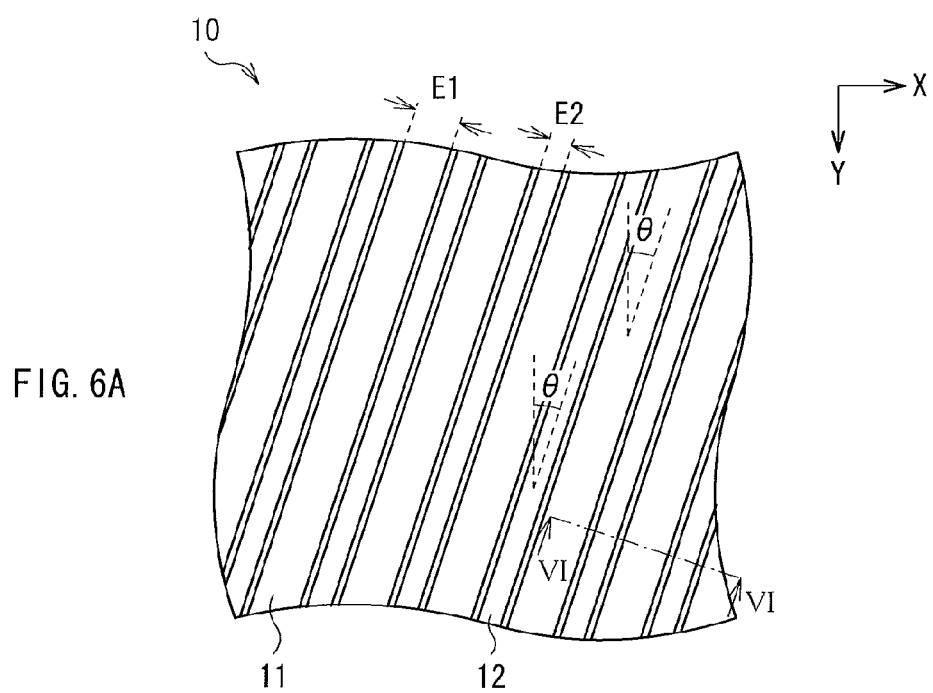
FIGS. 6A and 6B are schematic views illustrating an exemplary sectional configuration and an exemplary planar configuration of the liquid crystal barrier section shown in FIG. 1, respectively.
Figure 6B:
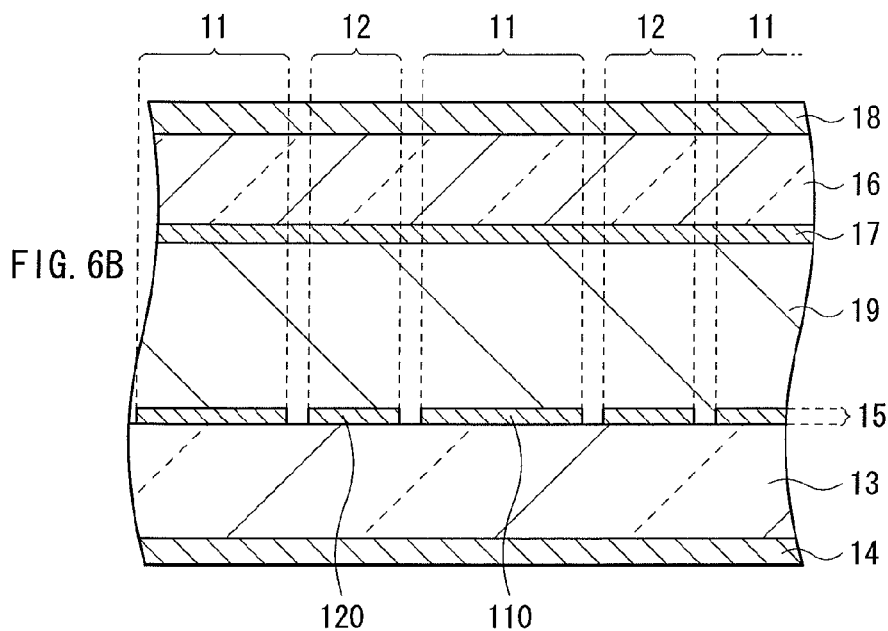

FIG. 6A illustrates an exemplary layout configuration of the opening-closing sections of the liquid crystal barrier section 10 in the XY plane. FIG. 6B schematically illustrates a sectional configuration of the liquid crystal barrier section 10. FIG. 6B is a sectional view taken along VI-VI line of FIG. 6A as viewed in the arrow direction.

The liquid crystal barrier section 10 is a so-called parallax barrier, and has a plurality of opening-closing sections 11 (a second sub-region) and opening-closing sections 12 (a first sub-region) for allowing light to pass therethrough or blocking light, as shown in FIGS. 6A and 6B. The opening-closing sections 11 and 12 perform different operations depending on whether the display device 1 performs a normal display (two-dimensional display) or a stereoscopic display (three-dimensional display). Specifically, as described later, the opening-closing sections 11 are set to an opened state (transmission state) in the case of a normal display, and to a closed state (blocking state) in the case of a stereoscopic display. As described later, the opening-closing sections 12 are set to an opened state (transmission state) in the case of a normal display, and are caused to perform an opening-closing operation in a time-divisional manner in the case of a stereoscopic display. The opening-closing sections 11 and the opening-closing sections 12 are alternately provided. For example, the opening-closing sections 11 and 12 may be driven in a group composed of selected opening-closing sections, and, such a drive on a group basis may be performed in a time-divisional manner.

The opening-closing sections 11 and opening-closing sections 12 are provided extending in one direction in the XY plane (here, in a direction at a predetermined angle θ with respect to a Y axis direction, for example) with a boundary section S therebetween. The angle θ may be set to 18 degrees, for example. Widths E1 and E2 of the opening-closing sections 11 and 12 are different from each other, and here, E1>E2 (E1≈2×E2, for example). It should be noted that, the relationship between the widths of the opening-closing sections 11 and 12 is not limited to this, and the relationship may be E1<E2 as well as E1=E2. The boundary section S is, for example, a portion corresponding to a slit between transparent electrodes 110 and 120 described later. The above-mentioned opening-closing sections 11 and 12 includes a liquid crystal layer (a liquid crystal layer 19 described later), and switching between opening and closing is made by a drive voltage applied to the liquid crystal layer 19.

Specifically, the liquid crystal barrier section 10 includes, as shown in FIG. 6B, transparent substrates 13 and 16 made of a glass or the like, and a liquid crystal layer 19 disposed between the transparent substrates 13 and 16, for example. Of the transparent substrates 13 and 16, the transparent substrate 13 is disposed on the light incident side, and the transparent substrate 16 is disposed on the light emitting side. Transparent electrode layers 15 and 17 made of, for example, ITO or the like are formed on a face of the transparent substrate 13 on the liquid crystal layer 19 side and a face of the transparent substrate 16 on the liquid crystal layer 19 side, respectively. Polarization plates 14 and 18 are bonded to the light incident side of the transparent substrate 13 and the light emitting side of the transparent substrate 16, respectively. The liquid crystal layer 19 may have a configuration in which a liquid crystal of a VA (vertical alignment) mode is used, for example. Configurations of each section will be described in detail below.

The transparent electrode layer 15 is divided into a plurality of transparent electrodes 110 and 120 to which a voltage may be individually supplied. On the other hand, a transparent electrode layer 17 is provided as a common electrode common to the transparent electrodes 110 and 120. In this example, a voltage of 0V is applied to the transparent electrode layer 17. The transparent electrode 110 of the transparent electrode layer 15 and a portion corresponding to the transparent electrode 110 in the transparent electrode layer 17 configure the opening-closing section 11 as a sub-region. Likewise, the transparent electrode 120 of the transparent electrode layer 15 and a portion corresponding to the transparent electrode 120 in the transparent electrode layer 17 configure the opening-closing section 12 as a sub-region. With this configuration, in the liquid crystal barrier section 10, the opening-closing operation is performed for each of the opening-closing sections 11 and 12 in such a manner that a voltage is selectively applied to the transparent electrodes 110 and 120 to align the liquid crystal of the liquid crystal layer 19 in accordance to the voltage. Orientation films not shown are formed on the transparent electrode layers 15 and 17 on the liquid crystal layer 19 side thereof.

The polarization plates 14 and 18 control the polarization direction of light incident on the liquid crystal layer 19 and the polarization direction of light to be emitted, respectively. The transmission axis of the polarization plate 14 is in the X axis direction, and the transmission axis of the polarization plate 18 is in the Y axis direction, for example. That is, the transmission axes of the polarization plates 14 and 18 are so set as to be at right angles to each other.

Figure 7:
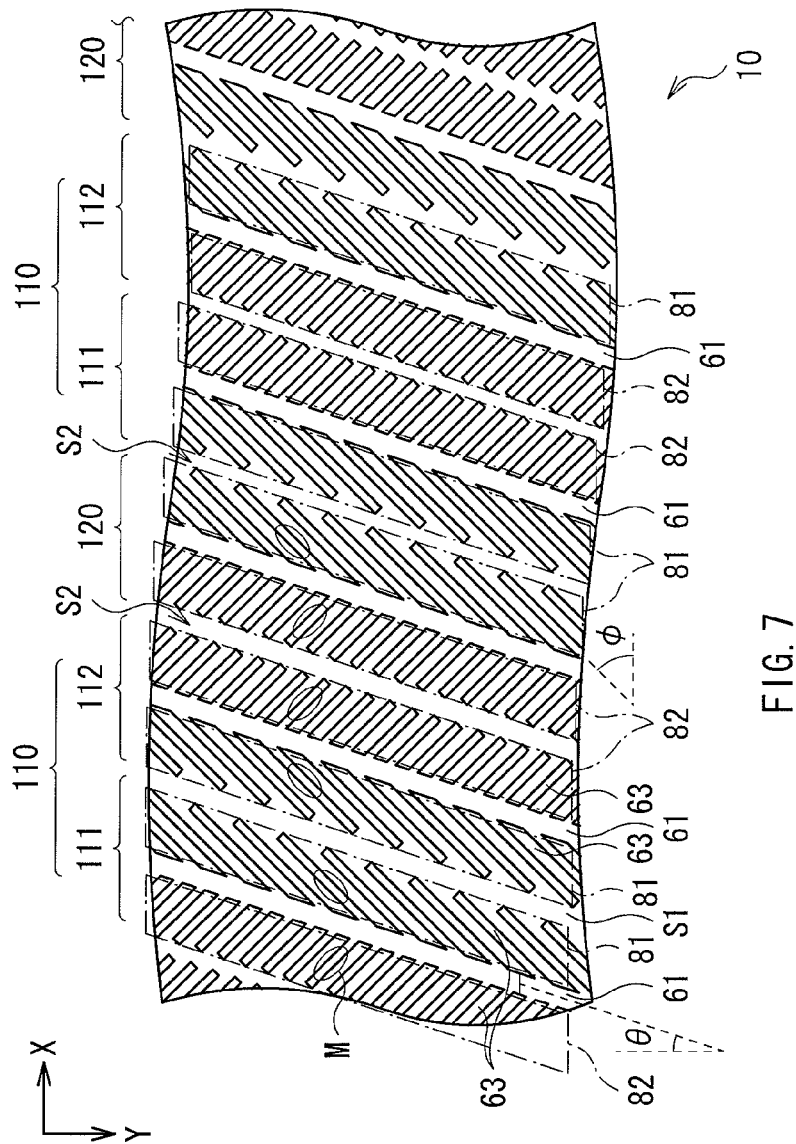
FIG. 7 is a plan view illustrating an exemplary configuration of a transparent electrode of the liquid crystal barrier section shown in FIG. 1.

FIG. 7 illustrates an exemplary configuration of the transparent electrodes 110 and 120 in the transparent electrode layer 15. The transparent electrode 110 has a pair of electrode portions 111 and 112 disposed facing each other with a slit S1 sandwiched therebetween. The pair of electrode portions 111 and 112 are mutually electrically connected at a part thereof by a connecting section not shown, and a common potential is supplied thereto. Each of the electrode portions 111 and 112 has a stem portion 61 that extends in the same direction as the opening-closing section 11 (direction at angle θ with respect to Y axis direction). Each of the pair of electrode portions 111 and 112 is provided with branch regions 81 and 82 that are segmented by the stem portion 61.

In each of the branch regions 81 and 82, a plurality of branch portions 63 that parallelly extend from the stem portion 61 as a base point are formed. The extending direction of the branch portions 63 in the branch region 81 and the extending direction of the branch portions 63 in the branch region 82 are different from each other, and are in a symmetrical relationship with respect to the Y axis direction (vertical direction) as a symmetrical axis. That is, extending direction of the branch portions 63 in the branch region 81 and the extending direction of the branch portions 63 in the branch region 82 are asymmetric with respect to the stem portion 61 as an axis. Specifically, the branch portions 63 of the branch region 81 extend in a direction rotated counterclockwise by a predetermined angle φ from the +X direction. On the other hand, the branch portions 63 of the branch region 82 extend in a direction rotated clockwise by a predetermined angle φ from the −X direction. The angle φ is set to, for example, 45 degrees.

The transparent electrode 120 has a structure similar to the electrode portions 111 and 112. That is, the transparent electrode 120 has a stem portion 61 that extends along the extending direction of the opening-closing section 12, and branch regions 81 and 82 which are segmented by the stem portion 61 and provided with a plurality of branch portions 63 extending in a predetermined direction.

Here, the electrode portion 111 and the electrode portion 112 are disposed so that the branch regions 81 or the branch regions 82 face with each other with the slit S1 sandwiched therebetween. Preferably, the slit S1 is continuously provided without a break from one end to the other end of a region corresponding to a display screen of the display section 20. In addition, the transparent electrode 120 and the electrode portions 111 and 112 are disposed so that the branch regions 81 thereof or the branch regions 82 thereof face with each other with a slit S2 sandwiched therebetween. The widths of the transparent electrodes 110 and 120 correspond to the widths E1 and E2 of the opening-closing sections 11 and 12, respectively. FIG. 7 illustrates an exemplary case where the electrode portions 111 and 112 and the transparent electrode 120 have substantially equivalent width. That is, in the liquid crystal barrier section 10, the mutual intervals of the slits S1 and S2 are substantially uniform.

With this configuration, when a voltage is applied to the transparent electrode layer 15 (the transparent electrodes 110 and 120) and the transparent electrode layer 17 and the potential difference thereof is increased, light transmittance in the liquid crystal layer 19 is increased, and the opening-closing sections 11 and 12 are set to the transmission state (opened state). On the other hand, when the potential difference is decreased, light transmittance in the liquid crystal layer 19 is decreased, and the opening-closing sections 11 and 12 are set to the blocking state (closed state).

It is to be noted that, while, in this example, the liquid crystal barrier section 10 performs a normally black operation, this is not limitative, and alternatively, the liquid crystal barrier section 10 may perform a normally white operation, for example. In this case, when the potential difference between the transparent electrode layer 15 and the transparent electrode layer 17 is increased, the opening-closing sections 11 and 12 are set to the blocking state, and when the potential difference is decreased, the opening-closing sections 11 and 12 are set to the transmission state. It is to be noted that, the selection between the normally black operation and normally white operation may be set by the polarization plate and the liquid crystal alignment, for example.

In the liquid crystal barrier section 10, the opening-closing sections 12 configures a group, and opening-closing sections 12 in the same group perform an opening operation and a closing operation at the same timing when a stereoscopic display is performed. The group of the opening-closing sections 12 will be described below.

Figure 8:
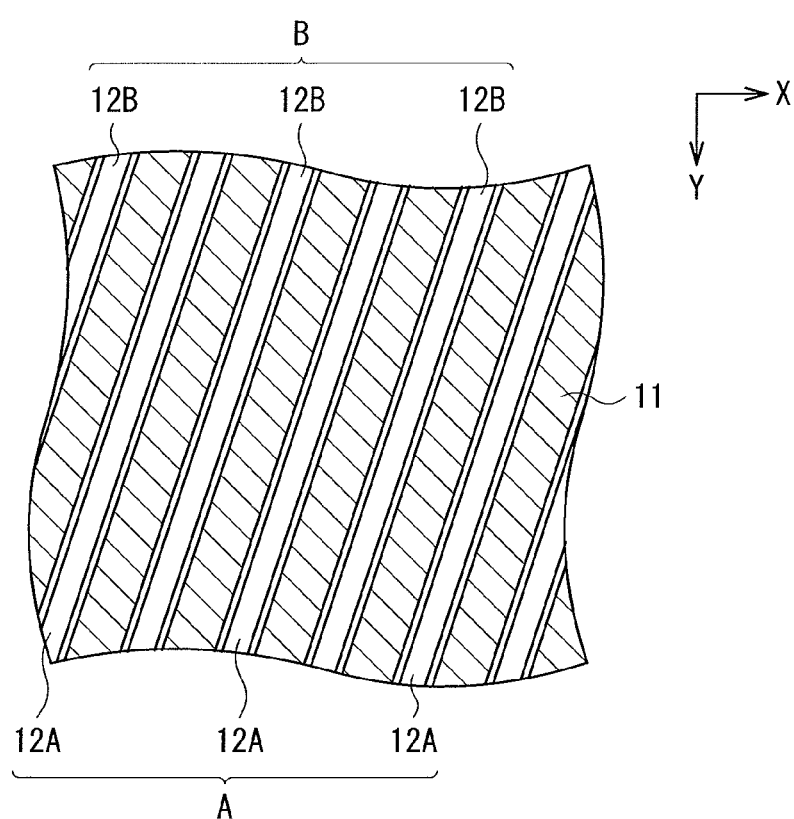
FIG. 8 is an explanatory diagram illustrating an exemplary group configuration of the liquid crystal barrier section shown in FIG. 1.

FIG. 8 illustrates an exemplary group configuration of the opening-closing sections 12. The opening-closing sections 12 configure two groups in this example. Specifically, the opening-closing sections 12 are alternately disposed and respectively configure a group A and a group B. It is to be noted that, in the following description, as a collective term, opening-closing sections 12 in the group A is appropriately referred to as an opening-closing section 12A, and likewise, opening-closing sections 12 in the group B is appropriately referred to as an opening-closing section 12B.

The barrier driving section 9 drives opening-closing sections 12 in the same group to perform an opening-closing operation at the same timing when a stereoscopic display is performed. Specifically, as described later, the barrier driving section 9 drives opening-closing sections 12A in the group A and opening-closing sections 12B in the group B to alternately perform an opening-closing operation in a time-divisional manner.

FIGS. 9A to 9C schematically illustrate, with use of a cross-sectional structure, a state of the liquid crystal barrier section 10 in the case where a stereoscopic display and a normal display (two-dimensional display) are performed. FIG. 9A shows a state where a stereoscopic display is performed, FIG. 9B shows another state where a stereoscopic display is performed, and FIG. 9C shows a state where a normal display is performed. In the liquid crystal barrier section 10, the opening-closing section 11 and the opening-closing section 12 (opening-closing sections 12A and 12B) are alternately disposed. FIGS. 10A and 10B show an exemplary case where one opening-closing section 12A is provided for every six pixels Pix of the display section 20. Likewise, one opening-closing section 12B is provided for every six pixels Pix of the display section 20.

In the case where the stereoscopic display is performed, image signals SA and SB are alternately supplied to the display driving section 50, and the display section 20 performs an image display in a time-divisional manner based on the supplied signals. In the liquid crystal barrier section 10, the opening-closing sections 12 (opening-closing sections 12A and 12B) perform an opening-closing operation in a time-divisional manner in synchronism with the time-divisional image display, and the opening-closing sections 11 maintain the closed state (blocking state). Specifically, when the image signal SA is supplied thereto, the opening-closing sections 12A are set to the opened state, and the opening-closing sections 12B are set to the closed state as shown in FIG. 9A. As described later, in the display section 20, six pixels Pix adjacent to each other which are disposed at a position corresponding to the opening-closing sections 12A perform a display corresponding to six perspective images included in the image signal SA. With this, when separately viewing different perspective images by the left eye and the right eye, the viewer senses the displayed image as a stereoscopic image, as described later. Likewise, when the image signal SB is supplied thereto, the opening-closing sections 12B are set to the opened state, and the opening-closing sections 12A are set to the closed state as shown in FIG. 9B. As described later, in the display section 20, six pixels Pix adjacent to each other which are disposed at a position corresponding to the opening-closing sections 12B perform a display corresponding to six perspective images included in the image signal SB. With this, when separately viewing different perspective images by the left eye and the right eye, the viewer senses the displayed image as a stereoscopic image, as described later. In the display device 1, an image is displayed while alternately opening the opening-closing sections 12A and the opening-closing sections 12B as described, and thus the resolution of the display device is enhanced.

As shown in FIG. 9C, when the normal display (two-dimensional display) is performed, both of the opening-closing sections 11 and the opening-closing sections 12 (the opening-closing sections 12A and 12B) in the liquid crystal barrier section 10 maintain the opened state (transmission state). With this, the viewer visually recognizes a typical two-dimensional image displayed on the display section 20 on the basis of the image signal S as it is.

[Operation and Function]

Next, the operation and function of the display device 1 of the present embodiment will be described.

(General Operation)

First, referring to FIG. 1, the general operation of the display device 1 is described. The control section 40 supplies the control signal to the display driving section 50, the backlight driving section 29, and the barrier driving section 9 on the basis of the externally-supplied image signal Vdisp so as to control the display driving section 50, the backlight driving section 29, and the barrier driving section 9 to operate in synchronism with one another. The backlight driving section 29 drives the backlight 30 on the basis of the backlight control signal CBL supplied from the control section 40. The backlight 30 outputs surface-emitted light to the display section 20. The display driving section 50 drives the display section 20 on the basis of the image signal S supplied from the control section 40. The display section 20 performs a display by modulating light emitted by the backlight 30. The barrier driving section 9 drives the liquid crystal barrier section 10 on the basis of the barrier control signal CBR supplied from the control section 40. The opening-closing sections 11 and 12 (12A and 12B) of the liquid crystal barrier section 10 perform the opening-closing operation on the basis of the barrier control signal CBR in order to allow light, which has emitted from the backlight 30 and has passed through the display section 20, to pass therethrough or block that light.

(Detailed Operation of Stereoscopic Display)

Next, referring to some figures, a detailed operation in the case where a stereoscopic display is performed is described.

FIGS. 10A and 10B illustrate exemplary operations of the display section 20 and the liquid crystal barrier section 10. To put it in detail, FIG. 10A shows the case where the image signal SA is supplied, and FIG. 10B shows the case where the image signal SB is supplied.

As shown in FIG. 10A, when the image signal SA is supplied thereto, each of the pixels Pix of the display section 20 displays pixel information P1 to P6 corresponding to respective six perspective images included in the image signal SA. At this time, the pieces of pixel information P1 to P6 are displayed on the respective pixels Pix disposed in the proximity to the opening-closing section 12A. When the image signal SA is supplied thereto, in the liquid crystal barrier section 10, the opening-closing section 12A is set to the opened state (transmission state), and the opening-closing section 12B is set to the closed state. The angle of light outputted from each pixel Pix of the display section 20 is limited by the opening-closing section 12A and then outputted. For example, the viewer may recognize a stereoscopic image by viewing pixel information P3 by the left eye, and pixel information P4 by the right eye.

As shown in FIG. 10B, when the image signal SB is supplied thereto, each of the pixels Pix of the display section 20 displays pixel information P1 to P6 corresponding to six perspective images included in the image signal SB. At this time, the pieces of pixel information P1 to P6 are displayed on the respective pixels Pix disposed in the proximity to the opening-closing section 12B. When the image signal SB is supplied thereto, in the liquid crystal barrier section 10, the opening-closing section 12B is set to the opened state (transmission state), and the opening-closing section 12A is set to the closed state. The angle of light outputted from each pixel Pix of the display section 20 is limited by the opening-closing section 12B and then outputted. For example, the viewer may recognize a stereoscopic image by viewing pixel information P3 by the left eye, and pixel information P4 by the right eye.

As described above, the viewer is allowed to separately view different pixel information of the pixel information P1 to P6 by the left eye and the right eye, so that the viewer is allowed to sense the image as a stereoscopic image. In addition, since an image is displayed by alternately opening the opening-closing section 12A and the opening-closing section 12B in a time-divisional manner, the viewer is allowed to view images displayed at positions displaced with each other while averaging the images. Therefore, the display device 1 realizes a doubled resolution compared to the case where only the opening-closing section 12A is employed. In other words, the resolution of the display device 1 is allowed to be $\frac{1}{3}$ ($=\frac{1}{6}\times 2$) compared to the case of the two-dimensional display.

(Viewing Angle Characteristic)

Here, the alignment of liquid crystal molecules M in the liquid crystal layer 19 of the liquid crystal barrier section 10 is described.

FIG. 7 schematically illustrates the alignment direction of the liquid crystal molecules M in the branch regions 81 and 82 when a voltage is applied thereto. It is to be noted that, although description will be given by taking the transparent electrode 110 (opening-closing section 11) as an example for the sake of convenience in this description, this also applies to the transparent electrode 120 (opening-closing section 12).

When no voltage is applied between the transparent electrode 110 (transparent electrode layer 15) and the transparent electrode layer 17, the liquid crystal molecules M are aligned in a direction perpendicular to the transparent electrode layers 15 and 17. At this time, the opening-closing section 11 of the liquid crystal barrier section 10 blocks light, in the closed state. On the other hand, when a voltage is applied between the transparent electrode 110 (transparent electrode layer 15) and the transparent electrode layer 17, the liquid crystal molecules M are inclined along the extending direction of the branch portions 63 of the branch regions 81 and 82 as shown in FIG. 7. Specifically, the liquid crystal molecules M are aligned such that the long axis direction of the liquid crystal molecules M is parallel to the equipotential plane. At this time, the opening-closing section 11 of the liquid crystal barrier section 10 allows light to pass therethrough, in the opened state.

As described, in the opened state, the liquid crystal molecules M are aligned in a direction at an angle φ (for example 45 degrees) with respect to the X axis direction in the branch regions 81 and 82 as shown in FIG. 7. That is, the alignment direction of the liquid crystal molecules M is an intermediate direction between the direction of the transmission axis of the polarization plate 14 (X axis direction, in this example) and the direction of the transmission axis of the polarization plate 18 (Y axis direction, in this example). Thus, it is possible to make the viewing angle characteristic of the display device 1 symmetrical in the left and right direction and in the up and down direction.

COMPARATIVE EXAMPLE

Next, by comparing with a comparative example, a function of the display device 1 of the present embodiment will be described. The present comparative example has a configuration similar to that of the above-mentioned embodiment except that the planar shape of the transparent electrode in the liquid crystal barrier section is different from that of the above-mentioned embodiment.

Figure 11:
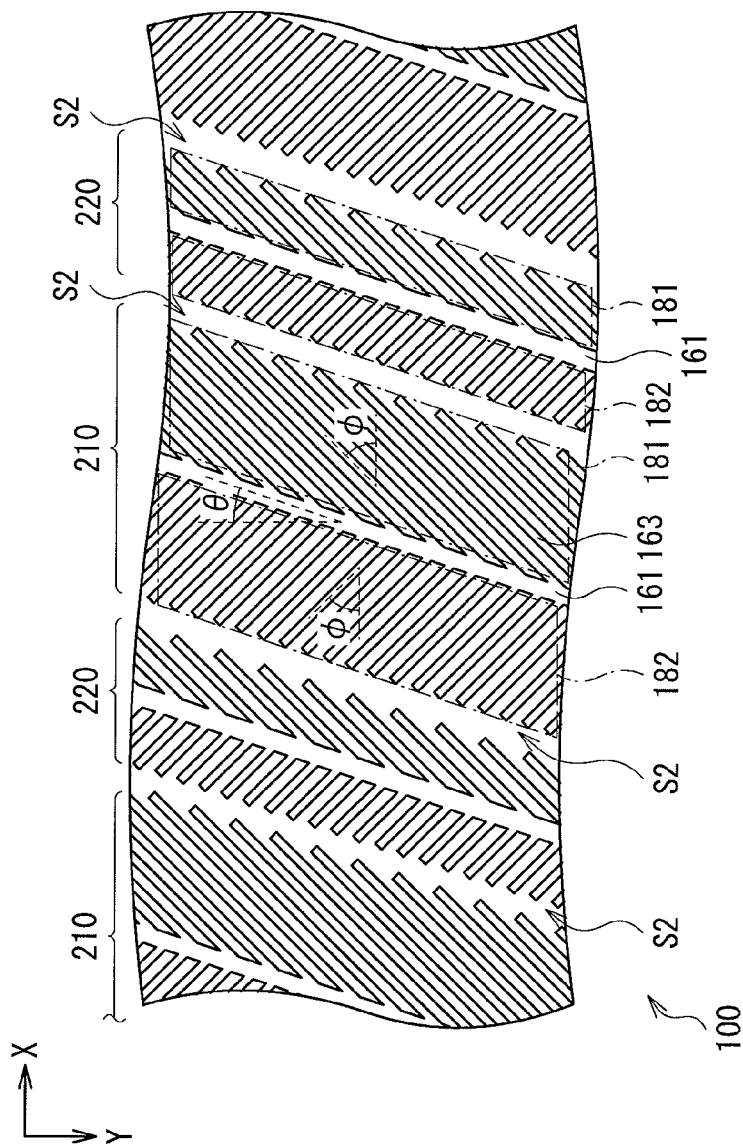
FIG. 11 is a plan view illustrating an exemplary configuration of a transparent electrode in a liquid crystal barrier section of a comparative example.

FIG. 11 illustrates an exemplary configuration of transparent electrodes 210 and 220 in a liquid crystal barrier section 100 of a comparative example. Each of the transparent electrodes 210 and 220 has a stem portion 161 and a plurality of branch portions 163 provided in branch regions 181 and 182 segmented by the stem portion 161. That is, the transparent electrode 210 does not have a pair of electrode portions disposed facing each other with a slit S1 sandwiched therebetween. Alternatively, like the transparent electrode 220, the transparent electrode 210 is made up of one stem portion 161 and a plurality of branch portions 163 extending from both sides of the stem portion 161. The transparent electrode 210 and the transparent electrode 220 are separated by a slit S2. The widths of the transparent electrodes 210 and 220 correspond to widths E1 and E2 of the opening-closing sections 11 and 12. FIG. 11 shows a case of E1≈2×E2, and the length of the branch portion 163 in the branch regions 181 and 182 of the transparent electrode 210 is about twice the length of the branch portion 163 in the branch regions 181 and 182 of the transparent electrode 220. That is, in the liquid crystal barrier section 100, the mutual intervals of the slits S2 are uneven, in the state where a broad portion and a narrow portion are alternately arranged.

Figure 12:
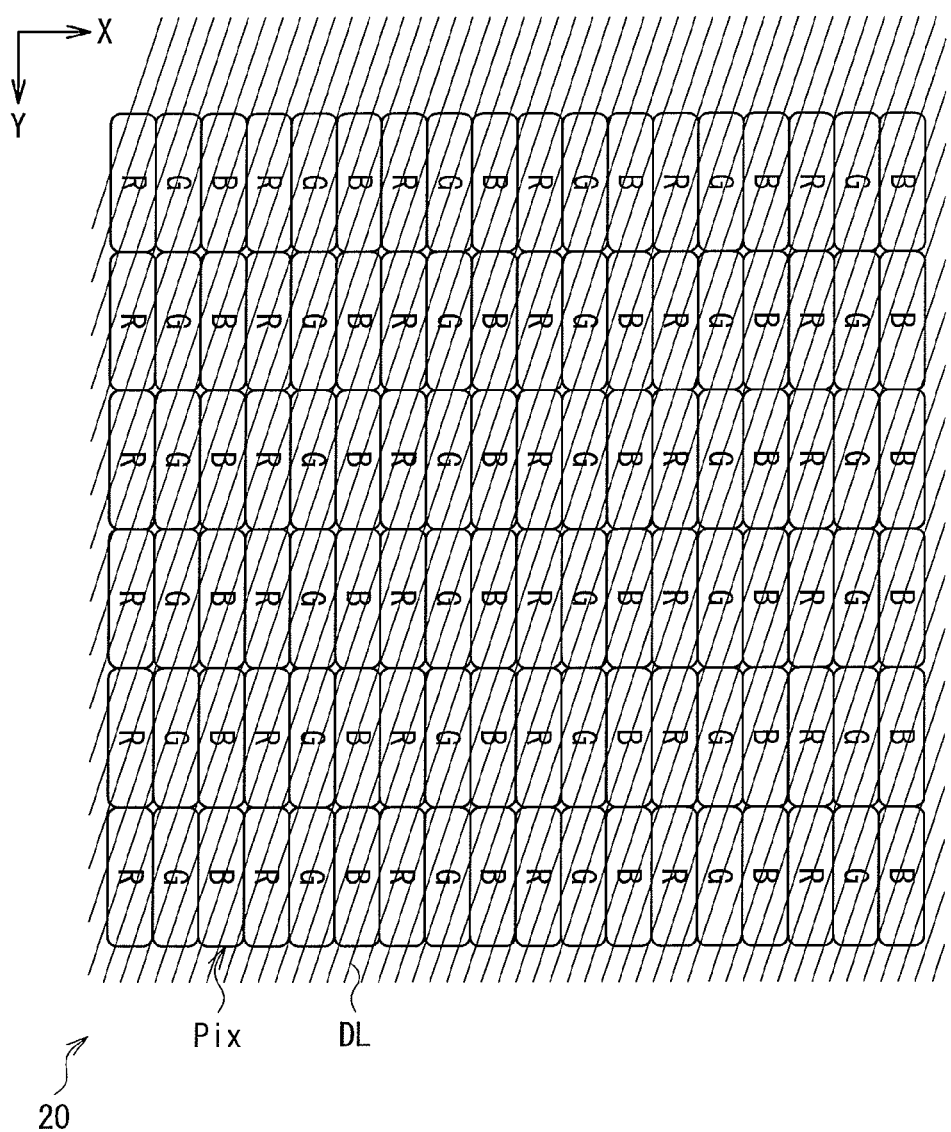
FIG. 12 is a schematic view illustrating a positional relationship between dark lines and pixels which are visually recognized when the liquid crystal barrier section and the display section shown in FIG. 1 are superposed.
Figure 13:
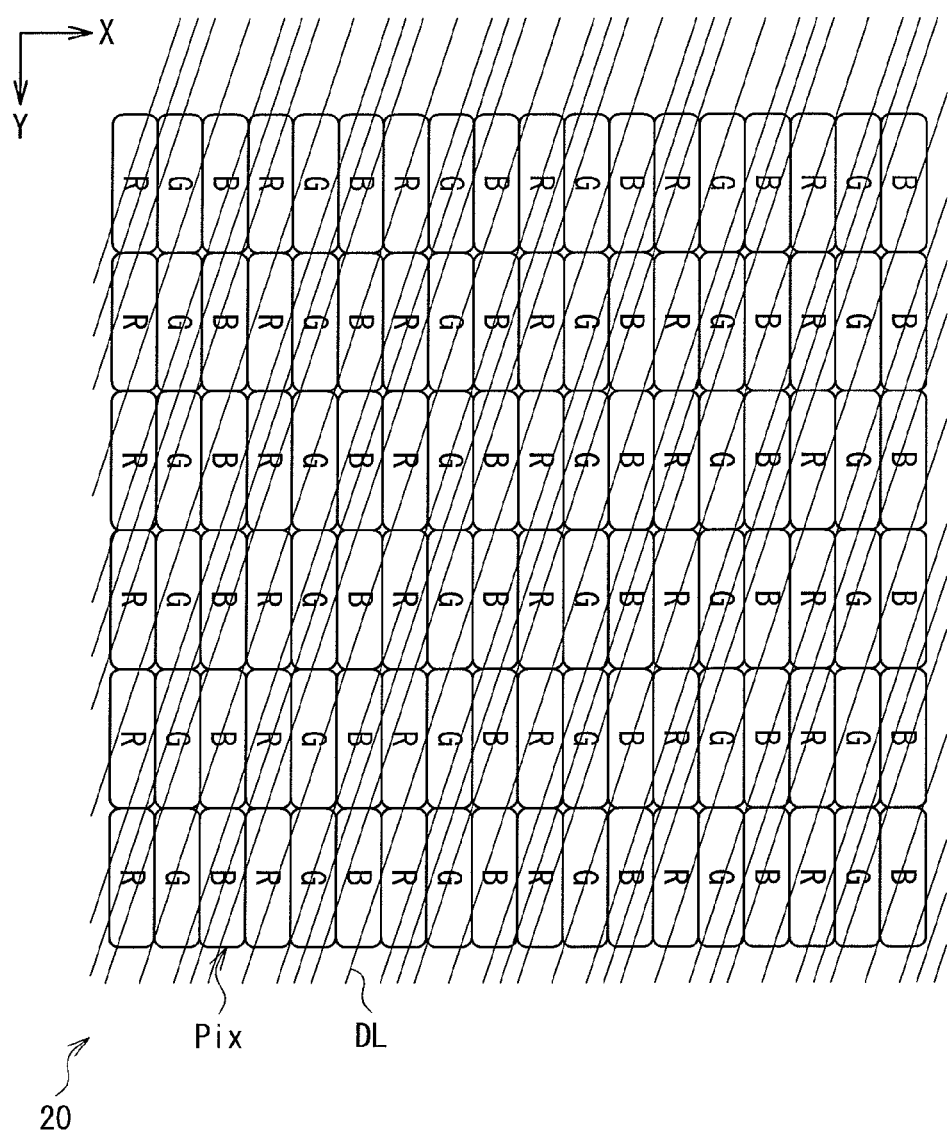
FIG. 13 is a schematic view illustrating a positional relationship between dark lines and pixels which are visually recognized when the liquid crystal barrier section and the display section of comparative example shown in FIG. 11 are superposed.

When the liquid crystal barrier sections 10 and 100 are respectively superposed on display section 20, the slits S2 are visually recognized as dark lines having a lower brightness than the surrounding portions as shown in FIGS. 12 and 13. FIG. 12 schematically illustrates a positional relationship between the pixels Pix and dark lines DL that are visually recognized by the viewer when the liquid crystal barrier section 10 of the present embodiment and the display section 20 are superposed. FIG. 13, schematically illustrates a positional relationship between the pixels Pix and dark lines DL that are visually recognized by the viewer when the liquid crystal barrier section 10 of the comparative example and the display section 20 are superposed. In FIG. 12, the number N, which is the number of dark lines DL superposed on each pixel Pix, is substantially the same in number over the entire screen (for example N=5). Therefore, the apparent brightness of each pixel Pix is substantially even over the entire screen. In contrast, in FIG. 13, the number of dark lines DL superposed on each pixel Pix, that is, the number N, is unequal and uneven (N=3 or 4, for example). The mutual intervals of dark lines DL are also uneven. Consequently, the apparent brightness of each pixel Pix differs depending on the position in the display screen in an in-plane direction. As a result, a moire that extends along the extending direction of the slit S2 tends to occur, which is unfavorable.

[Effect]

As described above, in the present embodiment, the transparent electrode 110 of the liquid crystal barrier section 10 includes a pair of electrode portion 111 and 112 disposed facing each other in such as manner as to sandwich the slit S1 extending in a predetermined direction different from the arrangement direction of the pixels Pix. Thus, even when the widths of the transparent electrode 110 and the transparent electrode 120 are very different from each other, it is possible to reduce the unevenness in the number and mutual intervals of the dark lines DL superposed on pixels Pix and visually recognized by the viewer. Consequently, the variation in the apparent brightness of the pixels Pix is suppressed, and the unevenness in the apparent brightness in the display screen is lessened. Accordingly, it is possible to effectively suppress the occurrence of the moire in both cases of the two-dimensional display and the three-dimensional display. Hence, it is possible to achieve an improved image quality.

In addition, in the present embodiment, the opening-closing section 11 and opening-closing section 12 in the liquid crystal barrier section 10 are extended in a direction inclined with respect to the arrangement direction of the pixels Pix in the display section 20. Thus, it is possible to improve a balance between a resolution in the horizontal direction and a resolution in the vertical direction in a stereoscopic display.

In addition, in the present embodiment, the viewing angle in the lateral direction may be symmetrical. This is because the extending direction of the branch portion 63 of the branch region 81 and the extending direction of the branch portion 63 of the branch region 82 are symmetrical with respect to the Y axis direction as an axis.

In addition, in the present embodiment, the branch portion 63 of the branch region 81 are extended in a direction rotated counterclockwise by 45 degrees with respect to the horizontal direction, and the branch portion 63 of the branch region 82 are extended in a direction rotated clockwise by 45 degrees with respect to the horizontal direction. Thus, it is possible to realize a wide viewing angle.

Figure 14:
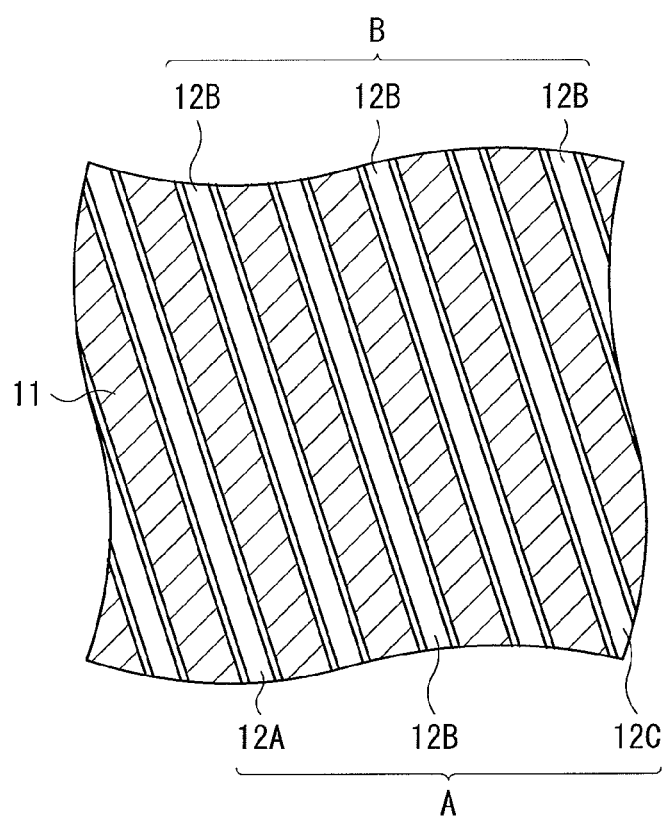
FIG. 14 is an explanatory diagram illustrating an exemplary configuration of opening-closing sections of a liquid crystal barrier section of a first modification.

While the present technology has been described with reference to some embodiments, the present technology is not limited to these embodiments and the like, and various modifications may be made. For example, while in the above-mentioned embodiment, the opening-closing sections 11 and 12 in the liquid crystal barrier section 10 are extended rightwardly upward with respect to the horizontal direction (X axis direction). However, in one embodiment of the present technology, as a modification (modification 1) shown in FIG. 14 for example, the opening-closing sections 11 and 12 may be extended leftwardly upward. In addition, while angle θ is 18 degrees in the above-mentioned embodiment, other numerical values may be adopted in one embodiment of the present technology.

Figure 15A:
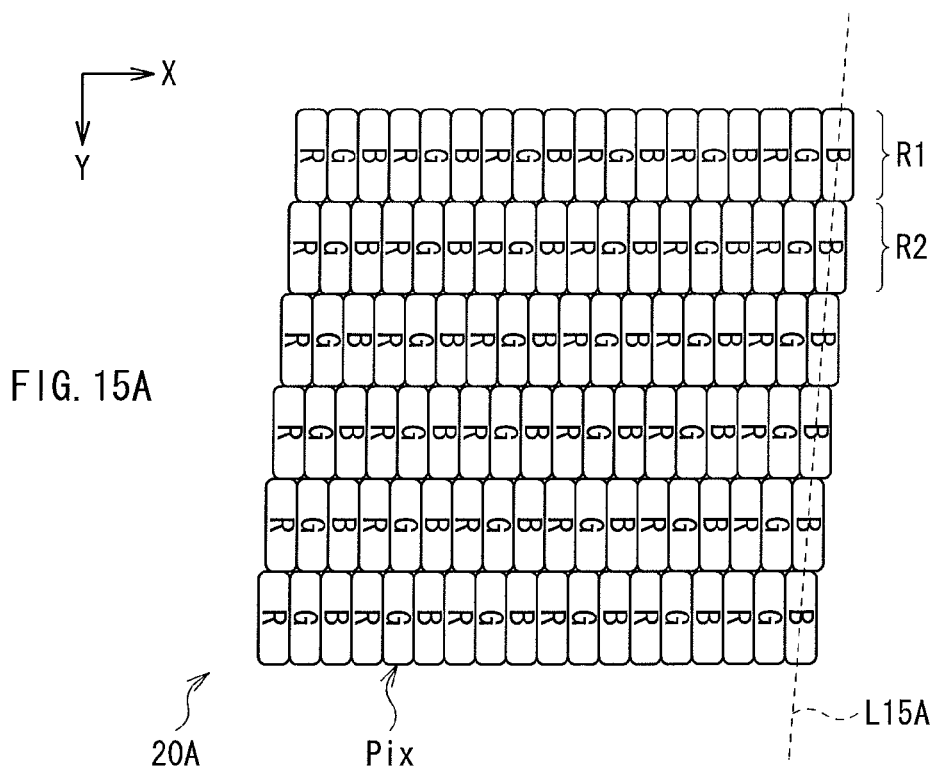
FIGS. 15A and 15B are explanatory diagrams illustrating an exemplary configuration of a pixel arrangement of a display section and an exemplary configuration of opening-closing sections of a liquid crystal barrier section of a second modification, respectively.
Figure 15B:
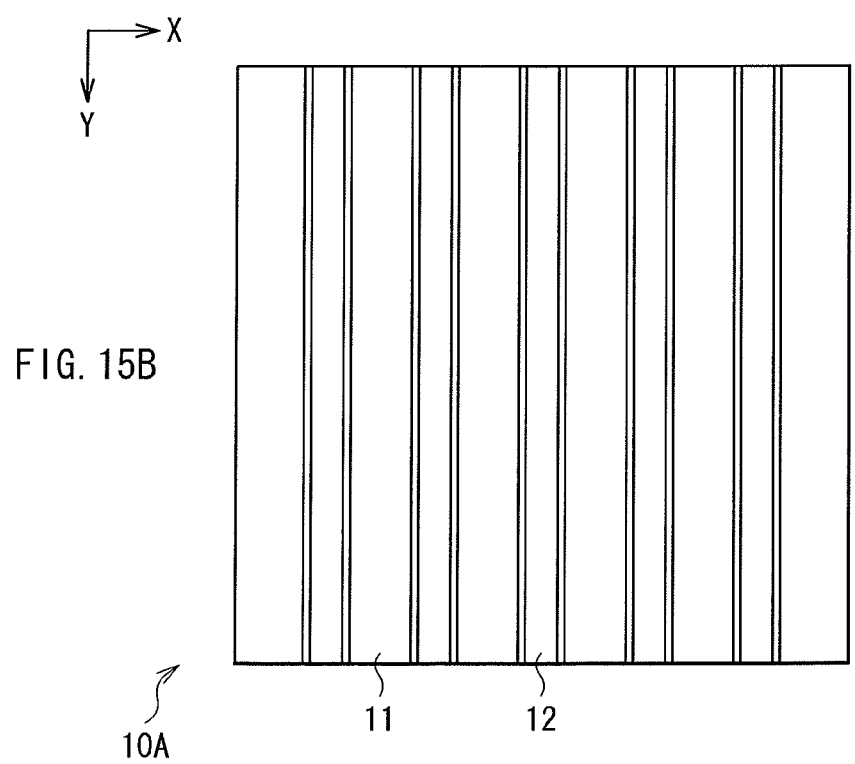

In addition, while, in the above-mentioned embodiment, the pixels Pix in the display section 20 are arranged in the horizontal direction and the vertical direction, and the opening-closing sections 11 and 12 in the liquid crystal barrier section 10 are extended in an oblique direction, the present technology is not limited to this. For example, a configuration shown in FIGS. 15A and 15B may be adopted. Specifically, the arrangement direction of the pixels Pix may be the horizontal direction and an oblique direction, and the extending direction of the opening-closing sections 11 and 12 in the liquid crystal barrier section 10, that is, the extending direction of slits 51 and S2 (not illustrated) may be the vertical direction (Y axis direction). FIG. 15A illustrates a pixel arrangement of a display section 20A as a modification (modification 2), and FIG. 15B illustrates a layout of an opening-closing sections of a liquid crystal barrier section 10A as a modification 2. As shown in FIG. 15A, in the display section 20A of the present modification, rows of a plurality of pixels Pix which are extended in the X axis direction and adjacent to one another in the Y axis direction are formed. Here, when focusing on pixel rows R1 and R2 for example, a virtual line L15A, which passes through a center position of each pixel Pix in the pixel row R1 and a center position of each pixel Pix in the pixel row R2, is inclined at a predetermined angle with respect to the vertical direction (Y axis direction). Also in the modification as described, an effect similar to that of the above-mentioned embodiment is obtained.

In addition, while, in the above-mentioned embodiment, the liquid crystal barrier section 10, the display section 20, and the backlight 30 are disposed in this order from the viewer side in the display device 1, this is not limitative. For example, like a display device 1A of a modification (modification 3) shown in FIGS. 16A and 16B, the display section 20, the liquid crystal barrier section 10, and the backlight 30 may be disposed in this order from the viewer side.

Figure 16A:
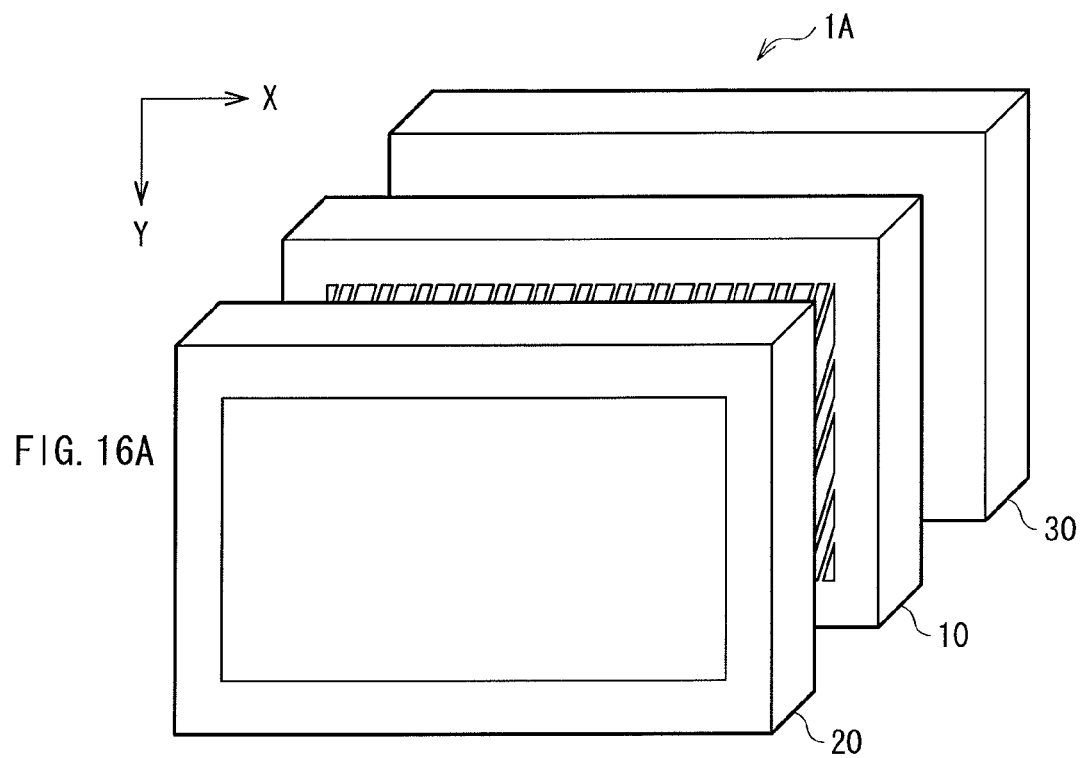
FIGS. 16A and 16B are explanatory diagrams each illustrating an exemplary configuration of a display device of a third modification.
Figure 16B:
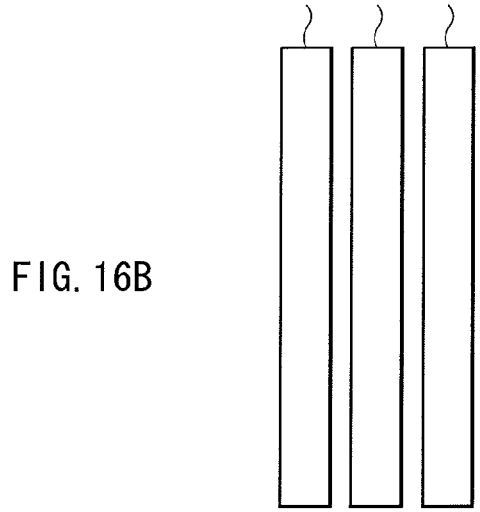

FIGS. 17A and 17B illustrate exemplary operations of the display section 20 and the liquid crystal barrier section 10 of the modification 3 shown in FIGS. 16A and 16B. To be more specific, FIG. 17A shows a case where the image signal SA is supplied, and FIG. 17B shows a case where the image signal SB is supplied. In the modification 3, light emitted from the backlight 30 firstly enter the liquid crystal barrier section 10. Then, among that light, light which has passed through the opening-closing sections 12A and 12B is modulated in the display section 20, and six perspective images are outputted.

In addition, while the opening-closing sections 12 configure two groups in the above-mentioned embodiment, this is not limitative. Alternatively, for example, the opening-closing sections 12 may configure three or more groups. This further improves the resolution of the display.

In addition, while the display section 20 is configured of the liquid crystal display section in the above-mentioned embodiment, this is not limitative. Alternatively, for example, an EL display section using an organic EL (Electro Luminescence) or the like may be adopted. In this case, the backlight driving section 29 and the backlight 30 shown in FIG. 1 may be omitted.

Thus, it is possible to achieve at least the following configurations from the above-described example embodiments and the modifications of the disclosure.

(1) A display device, including:
  a display section including a plurality of display pixels; and
  a liquid crystal barrier section including a plurality of barrier regions, each of the barrier regions extending in a first direction inclined with respect to an arrangement direction of the display pixels, and allowing light to transmit therethrough and blocking the light, wherein the liquid crystal barrier section includes
  a liquid crystal layer, and
  a first electrode layer and a second electrode layer interposing the liquid crystal layer in between, the first electrode layer including an electrode pattern having a slit provided along the first direction in the barrier regions.

(2) The display device according to (1), wherein the slit is continuously provided from a first end to a second end of a region corresponding to a display screen of the display section.

(3) The display device according to (1) or (2), wherein a plurality of display modes are included, the display modes including a three-dimensional image display mode and a two-dimensional image display mode,
  the barrier regions include a first sub-region and a second sub-region,
  the display section displays a plurality of different perspective images, and the first sub-region is in a transmission state and the second sub-region is in a blocking state, to allow a three-dimensional image to be displayed in the three-dimensional image display mode, and
  the display section displays a single perspective image, and the first sub-region and the second sub-region are in the transmission state, to allow a two-dimensional image to be displayed in the two-dimensional image display mode.

(4) The display device according to (3), wherein the first electrode layer includes the electrode pattern in the second sub-region.

(5) The display device according to any one of (1) to (4), wherein the electrode pattern includes a pair of electrode portions disposed facing each other with the slit interposed in between, the pair of electrode portions include respective portions electrically connected to each other.

(6) The display device according to (5), wherein the pair of electrode portions include:
  a stem portion extending in the first direction; and
  a branch portion extending from the stem portion as a base point in a direction different from the first direction.

(7) The display device according to (6), wherein the branch portion includes a plurality of branch portions provided, on both sides of the stem portion, asymmetrically with respect to the stem portion.

(8) The display device according to (6), wherein the branch portion includes a plurality of branch portions provided on both sides of the stem portion, the arrangement direction of the display pixels and an orientation of the branch portions being symmetrical to each other.

(9) The display device according to any one of (1) to (8), wherein
  the display section includes a plurality of signal lines and a plurality of scan lines configured to supply a voltage to the display pixels, and
  the arrangement direction of the display pixels is substantially a direction along an extending direction of the signal lines and an extending direction of the scan lines.

(10) A display device, including:
  a display section including a plurality of display modes, the display modes including a first mode and a second mode; and
  a liquid crystal barrier section including a plurality of barrier regions, the barrier regions including a first sub-region and a second sub-region and allowing light to transmit therethrough and blocking the light, the first sub-region being in a transmission state and the second sub-region being in a blocking state in the first mode, and the first and the second sub-regions being in the transmission state in the second mode, wherein the liquid crystal barrier section includes a liquid crystal layer, and a first electrode layer and a second electrode layer interposing the liquid crystal layer in between, the first electrode layer including an electrode pattern having a slit provided in the second sub-region.

The present disclosure contains subject matter related to that disclosed in Japanese Priority Patent Application JP 2011-093345 filed in the Japan Patent Office on Apr. 19, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
a display section including a plurality of display pixels; and
a liquid crystal barrier section including a plurality of barrier regions, each of the barrier regions extending in a first direction inclined with respect to an arrangement direction of the display pixels, and allowing light to transmit therethrough and blocking the light, wherein the liquid crystal barrier section includes
a liquid crystal layer, and
a first electrode layer and a second electrode layer interposing the liquid crystal layer in between, the first electrode layer including an electrode pattern having a slit provided along the first direction in the barrier regions.

2. The display device according to claim 1, wherein the slit is continuously provided from a first end to a second end of a region corresponding to a display screen of the display section.

3. The display device according to claim 1, wherein a plurality of display modes are included, the display modes including a three-dimensional image display mode and a two-dimensional image display mode,
the barrier regions include a first sub-region and a second sub-region,
the display section displays a plurality of different perspective images, and the first sub-region is in a transmission state and the second sub-region is in a blocking state, to allow a three-dimensional image to be displayed in the three-dimensional image display mode, and
the display section displays a single perspective image, and the first sub-region and the second sub-region are in the transmission state, to allow a two-dimensional image to be displayed in the two-dimensional image display mode.

4. The display device according to claim 3, wherein the first electrode layer includes the electrode pattern in the second sub-region.

5. The display device according to claim 1, wherein the electrode pattern includes a pair of electrode portions disposed facing each other with the slit interposed in between, the pair of electrode portions include respective portions electrically connected to each other.

6. The display device according to claim 5, wherein the pair of electrode portions include:
a stem portion extending in the first direction; and
a branch portion extending from the stem portion as a base point in a direction different from the first direction.

7. The display device according to claim 6, wherein the branch portion includes a plurality of branch portions provided, on both sides of the stem portion, asymmetrically with respect to the stem portion.

8. The display device according to claim 6, wherein the branch portion includes a plurality of branch portions provided on both sides of the stem portion, the arrangement direction of the display pixels and an orientation of the branch portions being symmetrical to each other.

9. The display device according to claim 1, wherein
the display section includes a plurality of signal lines and a plurality of scan lines configured to supply a voltage to the display pixels, and
the arrangement direction of the display pixels is substantially a direction along an extending direction of the signal lines and an extending direction of the scan lines.

10. A display device, comprising:
a display section including a plurality of display modes, the display modes including a first mode and a second mode; and
a liquid crystal barrier section including a plurality of barrier regions, the barrier regions including a first sub-region and a second sub-region and allowing light to transmit therethrough and blocking the light, the first sub-region being in a transmission state and the second sub-region being in a blocking state in the first mode, and the first and the second sub-regions being in the transmission state in the second mode, wherein the liquid crystal barrier section includes
a liquid crystal layer, and
a first electrode layer and a second electrode layer interposing the liquid crystal layer in between, the first electrode layer including an electrode pattern having a slit provided in the second sub-region.

* * * * *